(12) United States Patent
Okada et al.

(10) Patent No.: US 7,775,318 B2
(45) Date of Patent: Aug. 17, 2010

(54) STEERING SHAFT JOINT STRUCTURE

(75) Inventors: Megumu Okada, Wako (JP); Keita Yagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 12/068,915

(22) Filed: Feb. 13, 2008

(65) Prior Publication Data

US 2008/0199253 A1 Aug. 21, 2008

(30) Foreign Application Priority Data

Feb. 16, 2007 (JP) .............................. 2007-036929

(51) Int. Cl.
*B62D 3/00* (2006.01)
(52) U.S. Cl. .................................. 180/444
(58) Field of Classification Search ................ 180/443, 180/444, 446
See application file for complete search history.

(56) References Cited

U.S. PATENT DOCUMENTS

| | | | |
|---|---|---|---|
| 4,999,003 A * | 3/1991 | Koishi et al. ................. | 280/103 |
| 6,543,569 B1 * | 4/2003 | Shimizu et al. ............. | 180/444 |
| 6,900,564 B2 * | 5/2005 | Kobayashi et al. ........... | 310/83 |
| 7,481,293 B2 * | 1/2009 | Ogawa et al. ............... | 180/443 |
| 7,600,603 B2 * | 10/2009 | Okada et al. ................ | 180/444 |
| 7,661,506 B2 * | 2/2010 | Saito et al. .................. | 180/444 |

FOREIGN PATENT DOCUMENTS

JP       2004-231011 A    8/2004

* cited by examiner

*Primary Examiner*—Kevin Hurley
(74) *Attorney, Agent, or Firm*—Westerman, Hattori, Daniels & Adrian, LLP (57) ABSTRACT

A steering shaft joint structure capable of absorbing a rotational phase difference between an input shaft of a power steering unit and an output shaft thereof includes an inner splined portion 53 of a steering joint member 51 joined to an input shaft of a power steering unit and an outer splined portion 55 of the steering joint member 51 joined to a steering shaft. A predetermined rotational phase difference is set between the inner splined portion 53 of the steering joint member 51 and the outer splined portion 55 thereof.

2 Claims, 8 Drawing Sheets

| | MEMBER1 | MEMBER2 | MEMBER3 | MEMBER4 | MEMBER5 | MEMBER6 | MEMBER7 |
|---|---|---|---|---|---|---|---|
| θ | θ0−3° | θ0−2° | θ0−1° | θ0° | θ0+1° | θ0+2° | θ0+3° |

STEERING SHAFT JOINT STRUCTURE

TECHNICAL FIELD

The present invention relates to a steering shaft joint structure with which a steering shaft joined to the steering-handle is joined to a steering mechanism, which is joined to a steered road wheel with a power steering unit being disposed between the steering shaft and the steering mechanism.

BACKGROUND OF THE INVENTION

In a conventional example of the above-mentioned steering shaft joint structures, a universal joint is provided at the bottom end portion of the steering shaft, the steering shaft is joined to an input shaft of the power steering unit with the universal joint disposed in between, and a steering mechanism is joined to an output shaft of the power steering unit (see, for example, Japanese Patent Application Laid-Open Publication No. 2004-231011).

SUMMARY OF THE INVENTION

A difference, within a tolerance, in rotational reference position is sometimes observed between the input and the output shafts of a power steering unit. Such a difference, known also as "rotational phase difference," causes the lack of synchronization between the actions of steering handlebar and the steered road wheels. When the vehicle runs straight, in particular, the rotational phase difference results in a misaligned neutral position of the steering handlebar. These problems that derive from the difference have to be dealt with.

So, the present invention provides a steering shaft joint structure capable of absorbing the rotational phase difference between the input and the output shafts of a power steering unit.

To address the problems, an embodiment described in a first aspect of the present invention provides a steering shaft joint structure. In the structure, a steering shaft (for example, a steering shaft 21 in the embodiment) joined to a steering-handlebar (for example, a steering handlebar 22 in the embodiment) is joined, with a power steering unit (for example, a power steering unit 41 in the embodiment) disposed in between, to a steering mechanism (for example, a steering mechanism 32A in the embodiment) joined to a steered-road-wheel (for example, a front wheel 2 in the embodiment). In addition, the power steering unit includes an input shaft (for example, an input shaft 43 in the embodiment) joined to the steering shaft, and an output shaft (for example, an output shaft 42 in the embodiment) joined to the steering mechanism. Moreover, a first joint portion (for example, an inner splined portion 53, 153 in the embodiment) of a steering joint member (for example, a steering joint member 51, 151 in the embodiment) is joined to the input shaft or the output shaft. Meanwhile, a second joint portion (for example, an outer splined portion 55, 155 in the embodiment) is joined to the corresponding one of the steering shaft and the steering mechanism. Furthermore, a predetermined rotational phase difference is set between the first and the second joint portions of the steering joint member.

In the embodiment described in a second aspect of the present invention, the first joint portion of the steering joint member is joined to the input shaft or the output shaft by splined-fitting or serrated-fitting. Meanwhile, the second joint portion of the steering joint member is joined to the corresponding one of the steering shaft and the steering mechanism be joined to the steering joint member by means of any one of splined-fitting and serrated-fitting.

In the embodiment described in a third aspect of the present invention, a plurality of patterns are set for the rotational phase difference between the first and the second joint portions of the steering joint member.

According to the embodiments described in the first and the second aspects of the present invention, a rotational phase difference that occurs between the input and the output shafts of the power steering unit can be absorbed by the rotational phase difference between the joint portions of the steering joint member. Thus prevented is a sense of lack of synchronization between the actions of steering handlebar and the steered road wheels.

According to the embodiment described in the third aspect of the present invention, in response to, and for the purpose of cancelling, the rotational phase difference that occurs between the input and the output shafts, the rotational phase difference within the steering joint member can be selected. As a result, the rotational phase difference between the input and the output shafts can be absorbed easily without failure.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present invention will be described below with reference to the accompanying drawings. The directions, such as front, rear, right, and left, in the descriptions are the same as those in the vehicle unless indicated otherwise. In the drawings, the arrow FR indicates the frontward direction of the vehicle, and the arrow UP indicates the upward direction thereof.

Figure 1:
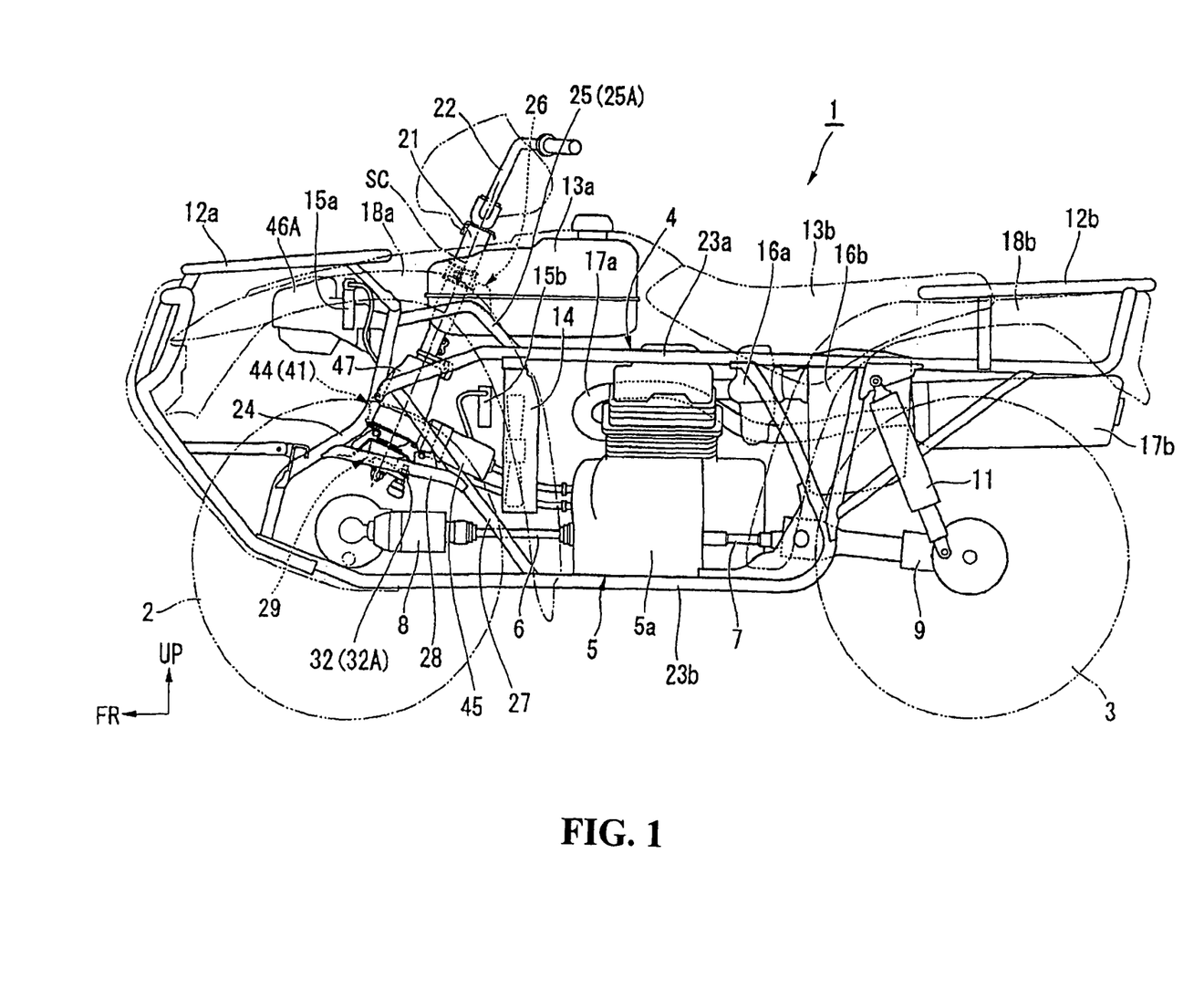
FIG. 1 is a left-side view of a saddle-ride type four-wheel vehicle according to an embodiment of the present invention.

FIG. 1 shows a saddle-ride type four-wheel vehicle (rough terrain vehicle) 1. The vehicle 1 has a compact, light-weight body and right and left front wheels 2 at the front of the body as well as right and left rear wheels 3 at the rear of the body. The front and the rear wheels 2 and 3 are low-pressure balloon tires of a relatively large size. The vehicle 1 has a relatively large minimum ground clearance to accomplish, mainly, easier driving over rough terrain. In short, the vehicle 1 is a so-called all terrain vehicle (ATV).

An engine 5, which is the power generator of the saddle-ride type four-wheel vehicle 1, is mounted on the substantially central portion of a body frame 4 of the vehicle 1. For example, the engine 5 is an air-cooled, single-cylinder engine, and is installed with the rotational axis of a crankshaft being arranged along the front-to-rear direction of the vehicle. To put it other way, the engine 5 has a lengthways type layout. A crankcase 5a is provided to form a lower portion of the engine 5, and serves also as the transmission case. A front propeller shaft 6 extends frontwards from a front portion of the crankcase 5a while a rear propeller shaft 7 extends rearwards from a rear portion thereof.

The propeller shafts 6 and 7 are connected respectively with a front reduction mechanism 8 in a front portion of the vehicle and with a rear reduction mechanism 9 in a rear portion thereof. The reduction mechanism 8 is connected with the front wheels 2 by a right and left drive shafts (not illustrated) respectively so that the power can be transmitted from the mechanism 8 to the wheels 2, and the reduction mechanism 9 is connected with the rear wheels 3 likewise. The right and the left front wheels 2 are suspended with an independent-type front suspensions (not illustrated) at a front portion of the body. The right and the left rear wheels 3 are suspended with an axle-type (swing-arm type) rear suspensions (only a rear cushion unit is denoted by reference numeral 11).

In an upper portion of the body of the saddle-ride type four-wheel vehicle 1, a front carrier 12a, a steering shaft 21, a fuel tank 13a, a saddle-ride type seat 13b, a rear carrier 12b and the like are disposed in this order from the front. The steering shaft 21 is arranged as being inclined upwards to the rear. A steering handlebar 22 with right and left grips is attached to the topmost portion of the steering shaft 21. Hereafter, the axis of the steering shaft 21 (steering axis) is represented by SC.

In addition, FIG. 1 shows: a air-cooling fan 14 for cooling the engine; upper and lower oil coolers 15a and 15b for cooling the engine oil; a throttle body 16a and an air-cleaner case 16b, both of which are parts of the air-intake system for the engine; an exhaust pipe 17a and a muffler 17b, both of which are part of the air-exhaust system for the engine; and front fenders 18a respectively for covering the upper outer circumferences of the front wheels 2 as well as rear fenders 18b respectively for covering the upper outer circumferences of the rear wheels 3.

The body frame 4 is made up of various pipes of steel that are joined together by, for example, welding. Specifically, the frame 4 includes right and left upper pipes 23a extending in the front-to-rear direction in the upper portion of the frame 4, and also includes right and left lower pipes 23b extending likewise in the lower portion of the frame 4. A right and left pair of closed loop structures are formed, in each of which the pipe 23a and the pipe 23b are main components. Plural cross members are provided to connect these structures, so that a box structure that has longer sides in the front-to-rear direction is formed at the center in the vehicle width direction.

A front pipe 24 is disposed as bridging a front end portion of the upper pipe 23a and a front end portion of the lower pipe 23b. The front pipe 24 has a crank shape when viewed from a side, with its upper side being closer to the rear of the vehicle than its lower side. An upper portion of the front pipe 24 extends further upwards than the upper pipe 23a. A top pipe 25, which bends downwards to the rear, is disposed as bridging the topmost portion of the front pipe 24 and a middle portion of the upper pipe 23a. A handle post portion 25A, which has a derrick shape, is formed in an upper front side of the body frame 4 with this top pipe 25 and the upper portion of the front pipe 24 being its main components.

Figure 2:
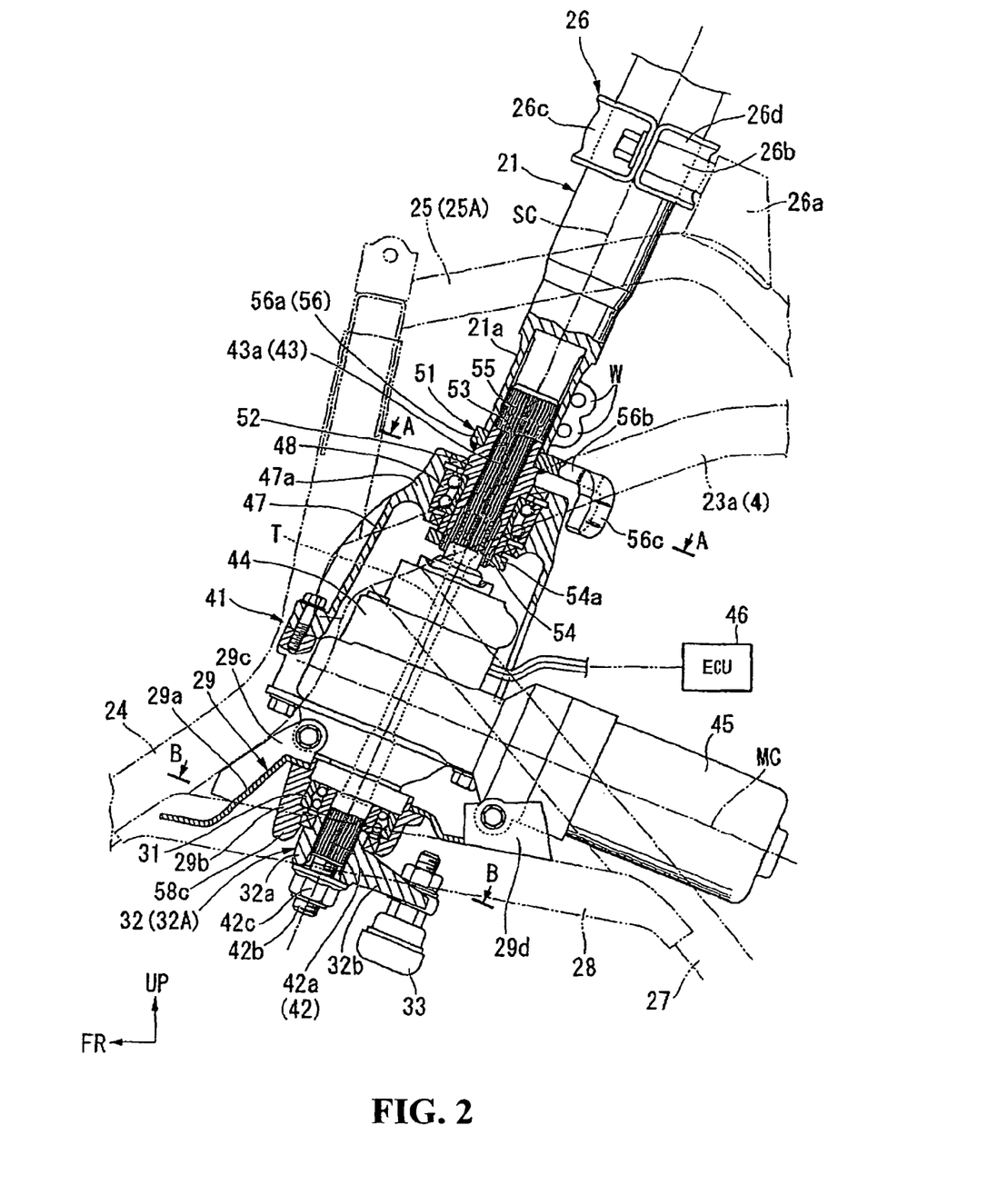
FIG. 2 is a left-side view of a power steering unit and its surroundings.

Now, refer also to FIG. 2. An upper shaft-supporting portion 26 is formed above the handle post portion 25A to support an upper portion of the steering shaft 21. The upper shaft-supporting portion 26 includes a cross member 26a that bridges the right and the left top pipes 25. Also included are right and left boss portions 26b that protrude frontwards from the cross member 26a. In addition, front and rear half bodies 26c and 26d are also included, and are bolted to the boss portions 26b. The half bodies 26c and 26d form a cylindrical shape, and, inside the inner circumferential surface of this cylindrical shape, the outer circumferential surface of the steering shaft 21 is held with a bushing or the like placed in between. The steering shaft 21 thus held is capable of moving rotationally.

Disposed as bridging a front end portion of the upper pipe 23a and a middle portion of the lower pipe 23b are left and right gusset pipes 27, which are inclined upwards to the front. Disposed as bridging a middle portion of the gusset pipes 27 and a middle portion of the front pipe 24 are left and right sub-gusset pipes 28, which are also inclined but less steeply than the gusset pipe 27. Between the right and left sub-gusset pipes 28, a lower shaft-supporting portion 29 is disposed to support an output shaft 42 (i.e., the lower end portion of the steering shaft 21) of a power steering unit 41, which is to be described in detail later.

The lower shaft-supporting portion 29 is a unified body of a lower support plate 29a, a lower shaft holder 29b, and front and rear supporting stays 29c and 29d. Here, the plate 29a bridges the right and left sub-gusset pipes 28, and has a trapezoidal shape when viewed from a side. The cylindrical holder 29b protrudes from the top-side portion of the plate 29a downwards along the steering axis SC. The stays 29c and 29d are positioned in front of and behind the plate 29a (that is, in front of and behind the steering axis SC), respectively. Inside the inner circumference of the holder 29b, an outer race of a self-aligning lower ball bearing 31 is fixedly held. The output shaft 42 is held by the holder 29b with the bearing 31 placed in between, and the shaft 42 thus held is capable of rotating relative to the holder 29b.

A lower portion of the output shaft 42 protrude further downwards than the lower shaft-supporting plate 29a. The outer circumference of the lower portion is splined (or serrated) to fit into a cylindrical base portion 32a of a pitman arm 32, so that the two portions are not allowed to rotate relative to each other. From now on, the outer circumferential portion of the lower portion of the output shaft 42 is referred to as an output-side splined portion 42a. An arm portion 32b extends rearwards from the base portion 32a of the pitman arm 32. The leading-end side of the arm portion 32b and an end of each of right and left tie rods 33 of the arm portion 32b are connected with a ball joint placed in between. The right and left tie rods 33 extend respectively to knuckles (not illustrated) of the right and left front wheel 2. Accordingly, when the steering handlebar 22, the steering shaft 21 and the like move rotationally, the right and the left front wheels 2 are steered in the same direction via the right and left tie-rods 33, respectively. To put it other way, a steering mechanism 32A of the saddle-ride type four-wheel vehicle is formed by the pitman arm 32, the right and left tie-rods 33, and the above-mentioned knuckles as main components.

A threaded shaft portion 42b extends coaxially out of the bottom end of the output-side splined portion 42a. The threaded shaft portion 42b sticks out downwards beyond the base portion 32a of the pitman arm 32, which is fitted onto the output-side splined portion 42a. Fastening a nut 42c that is screwed onto the threaded shaft portion 42b makes the base portion 32a of the pitman arm 32 and an inner race of the lower ball bearing 31 be held by and between the nut 42c and a step portion of the output shaft (not illustrated). The pitman arm 32 and the output shaft 42 are fixedly coupled together in this way.

The saddle-ride type four-wheel vehicle 1 is equipped with an electric power steering system. The power steering system reduces the force (steering force) that is applied on the steering handlebar 22 by the driver who operates the handlebar 22. In other words, the power steering system reduces the front-wheel steering force.

The power steering system includes the power steering unit 41 formed contiguously from the lower end portion of the steering shaft 21. An assist motor 45 is integrated into the power steering unit 41. The power steering system also includes a control unit 46, which is an electric control unit (ECU) to drive and control the assist motor 45 in accordance with the detection values of the torque sensor in the power steering unit 41.

Main components of the power steering unit 41 are a gear box 44 and the assist motor 45. The gear box 44 is disposed below and coaxially with the steering shaft 21 while the assist motor 45, which has a cylindrical shape, is disposed at the rear of the gear box 44. In addition, the drive shaft axis MC of the assist motor 45 is orthogonal to the steering shaft axis SC. Front and rear portions of the gear box 44 are respectively joined, by fastening bolts or the like, to the front and the rear supporting stays 29c and 29d of the lower support plate 29a. Thus, the gear box 44 is supported by the lower support plate 29a.

An input shaft 43 and the output shaft 42 stick out of the upper and the lower ends of the gear box 44, respectively. The two shafts 42 and 43 are arranged so as to share a common axis, specifically, the steering shaft axis SC. The two shafts 42 and 43 are coupled together in the gear box 44 with a torsion bar T as a part of the torque sensor set in between. Inside the gear box 44, the drive shaft of the assist motor 45 is connected with the output shaft 42 with a pair of a worm and a worm wheel. Accordingly, the drive power of the assist motor 45 is made transmissible to the output shaft 42.

A steering joint member 51, which is to be described later, is provided to join the input shaft 43 to the steering shaft 21. The input shaft 43 thus joined is not rotatable relative to the steering shaft 21.

When the steering handlebar 22 is turned either to the right or to the left, a ground resistance acts on the front wheels 2. Accordingly, a relative rotational force is generated between the input shaft 43, which is mechanically linked with the steering handlebar 22, and the output shaft 42, which is mechanically connected the two front wheels 2. Consequently, torsion acts on the torsion bar T, which is installed between the shafts 42 and 43.

On the basis of this torsion, the turning torque applied on the steering shaft 21, that is, the steering torque of the steering handlebar 22, is detected. To generate assisting power in accordance with the detection value, the control unit 46 drives and controls the assist motor 45.

Accordingly, an operation of turning the steering handlebar 22 makes the operational force of turning be inputted in the output shaft 42 from the steering handle bar 22. Concurrently, the auxiliary turning force from the assist motor 45 is also given to the output shaft 42. As a consequence, the operational force for the handle is lowered. Incidentally, A box 46A for electric apparatuses is provided on an upper side of a front portion of the body to accommodate the control unit 46 (see FIG. 1).

An upper shaft support case 47 is disposed over the gear box 44 to support the input shaft 43 and the steering joint member 51. The upper shaft support case 47 has a cup shape with its open side being directed downwards. A lower end portion of the upper shaft support case 47 is joined to and integrated into the outer peripheral portion of the gear box 44 by a fastening bolt or the like. Meanwhile, an upper end portion of the upper shaft support case 47 serves as a bearing portion 47a into which the input shaft 43 and the steering joint member 51 are inserted. An outer race of a self-aligning type upper ball bearing 48 is fixedly held by the inner circumference of the bearing portion 47a. The input shaft 43 and the steering joint portion 51 are held by the upper shaft support case 47 with the upper ball bearing 48 set in between so as to be rotatable relative to the upper shaft support case 47.

Figure 3:
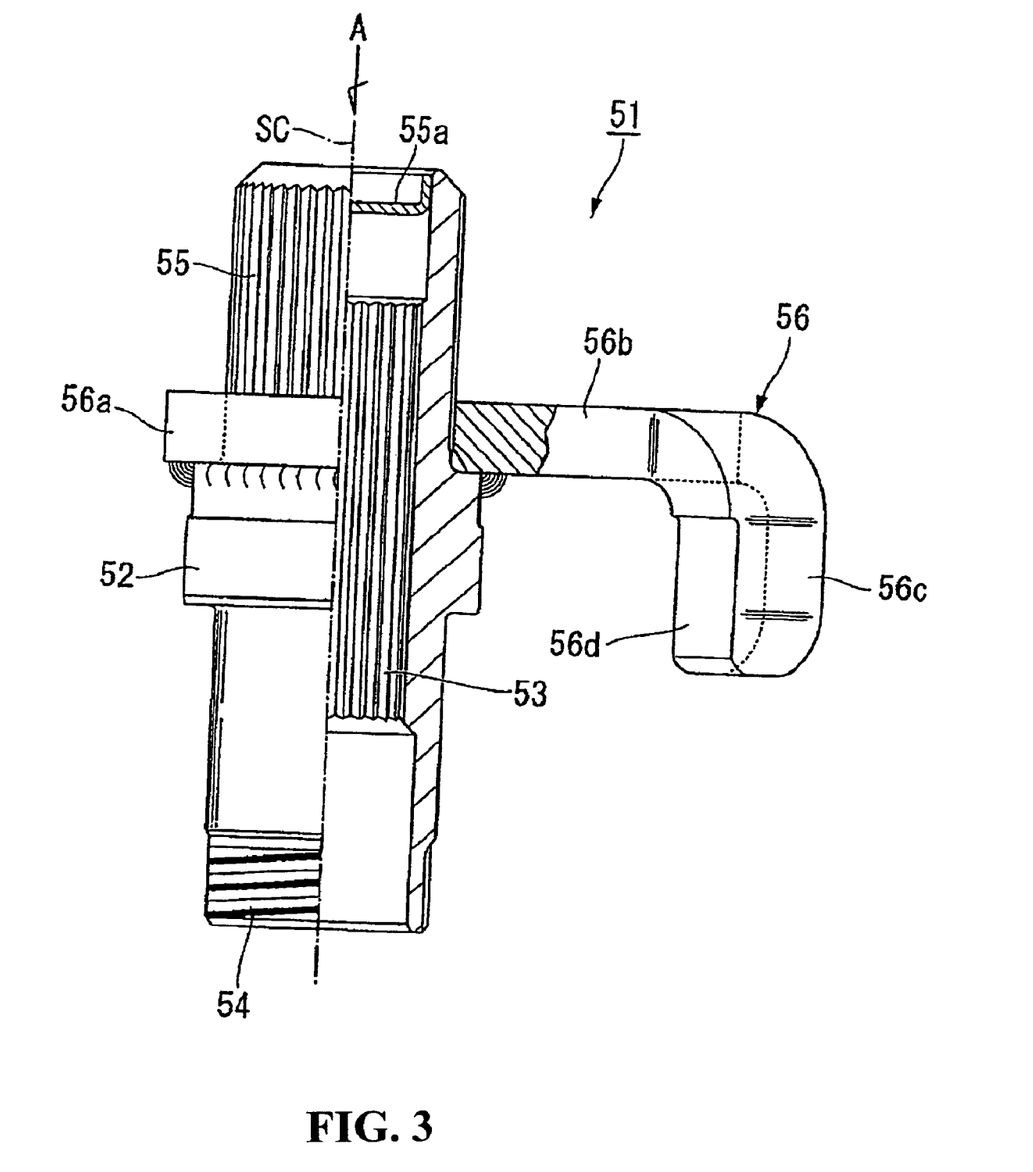
FIG. 3 is a partial cut-away of a side view of a steering joint member that lies between the power steering unit and a steering shaft.

As FIGS. 2 and 3 show, the steering joint member 51 is set between the lower end portion of the steering shaft 21 and the input shaft 43 to connect these shafts coaxially. The steering joint member 51 shares the steering shaft axis SC with other members, and has a cylindrical shape with a diameter substantially equal to that of the steering shaft 21. In addition, an enlarged diameter portion 52 with a predetermined width in the axial direction is formed in the middle portion and on the outer circumference of the steering joint member 51.

The inner circumferential portion of the steering joint member 51 is splined (or serrated) and is referred to as an inner splined portion 53. Meanwhile, the outer circumferential portion of the input shaft 43 is also splined (or serrated) so as to correspond to the inner splined portion 53. The outer circumferential portion is thus referred to as an input-side splined portion 43a. Fitting the input-side splined portion 43a into the inner splined portion 53 couples the steering joint member 51 and the input shaft 43 so as not to allow relative rotation to each other.

When the steering joint member 51 is held by the upper shaft support case 47, the lower end portion of the steering joint member 51 sticks out downwards beyond the upper ball bearing 48. The outer circumference of the lower end portion of the steering joint member 51 is threaded to be a male-threaded portion 54. Fastening a nut 54a that is screwed onto the male-threaded portion 54 makes an inner race of the upper ball bearing 48 be held by and between the nut 54a and the enlarged diameter portion 52. Accordingly the steering joint member 51 is held by the upper shaft support case with the upper ball bearing 48 set in between so that the steering joint member 51 can be allowed no movement in the axial direction relative to the upper shaft support case 47. The upper shaft support case 47 is fixed to the gear box 44. As a consequence, the steering joint member 51 and the input shaft 43 are joined together so that the steering joint member 51 can be allowed no movement in the axial direction relative to the input shaft 43.

The outer circumferential portion of the upper portion of the steering joint member 51 is splined (or serrated) and is referred to as an outer splined portion 55. Meanwhile, a cylindrical steering-side splined portion 21a is formed integrally with the steering shaft 21 at the lower end portion of the steering shaft 21. The inner circumferential portion of the cylindrical steering-side splined portion 21a is also splined (or serrated) so as to correspond to the outer splined portion 55. Inserting the outer splined portion 55 into the steering-side splined portion 21a couples the steering joint member 51 and the steering shaft 21 so as not to allow relative rotation to each other.

The steering-side splined portion 21a has a splitter groove that allows the steering-side splined portion 21a to reduce its diameter. Assume a state where the outer splined portion 55 is inserted into the steering-side splined portion 21a. In this state, fastening a splitter fastening portion W that is provided on the outer circumference of the steering-side spline portion 21a makes the steering-side spline portion 21 reduce its diameter. With such diameter reduction, the lower end portion of the steering shaft 21 and the upper portion of the steering joint member 51 are fixedly joined together. Incidentally, a cap 55a is attached to the inner circumference of the upper end portion of the outer splined portion 55.

Figure 4:
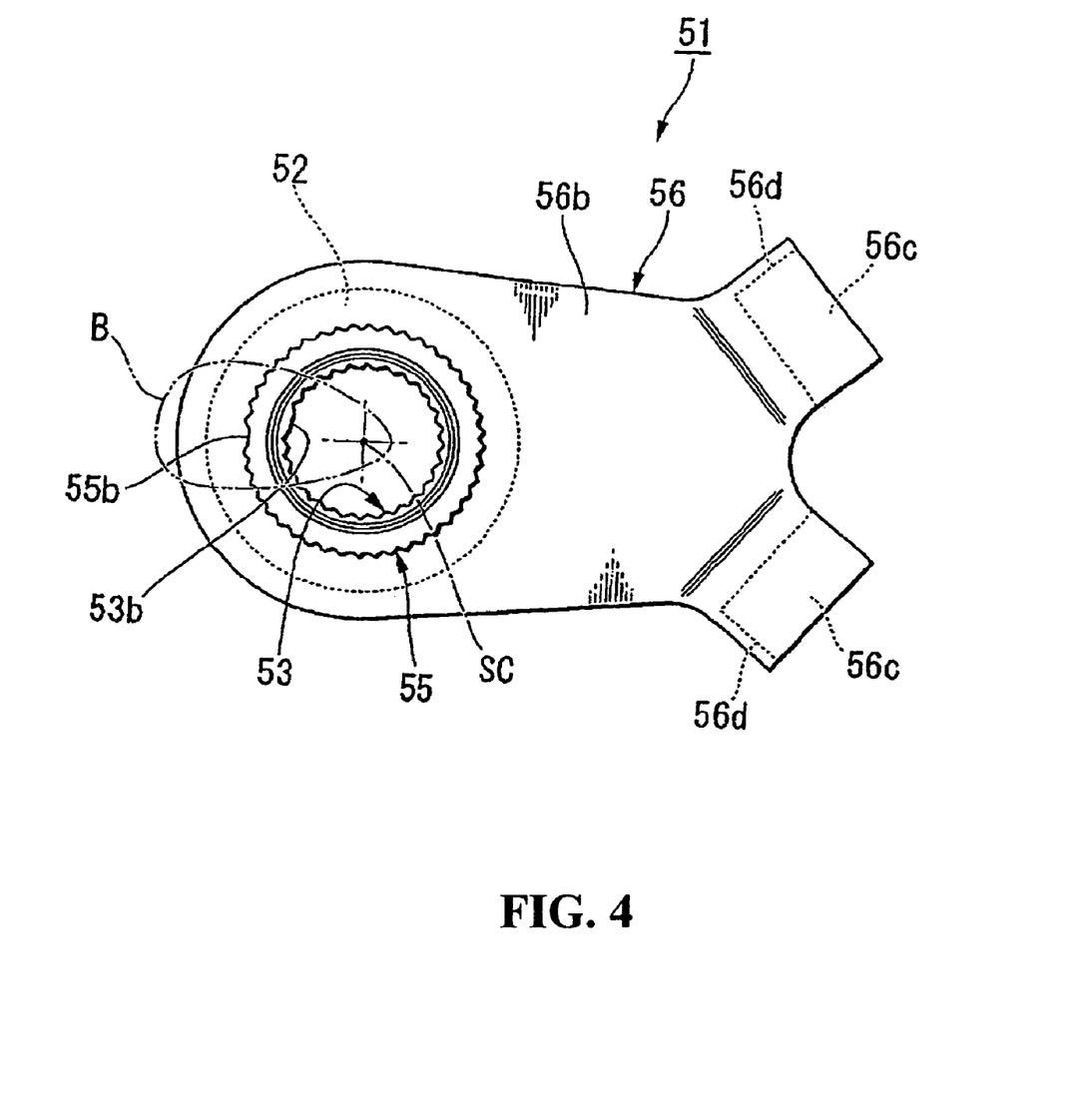
FIG. 4 is a top view of the steering joint member taken from the direction of the arrow A in FIG. 2.

Now, refer also to FIG. 4. To the base-end portion of the outer splined portion 55 of the steering joint member 51, a stopper arm 56, which is formed as a separate member, is attached so as to be integrated with the steering joint member 51. The stopper arm 56 includes a ring-shaped base portion 56a and an arm portion 56b that are formed into a single body. The base portion 56a is splined to fit onto the base-end portion of the outer splined portion 55 as being not allowed relative rotation to each other, and is welded to the enlarged diameter portion 52 from below. The arm portion 56b extends rearwards from the base portion 56a. A pair of stopper tags 56c is formed as branching from the leading-end side of the arm portion 56b, and is bent downwards.

Figure 6:
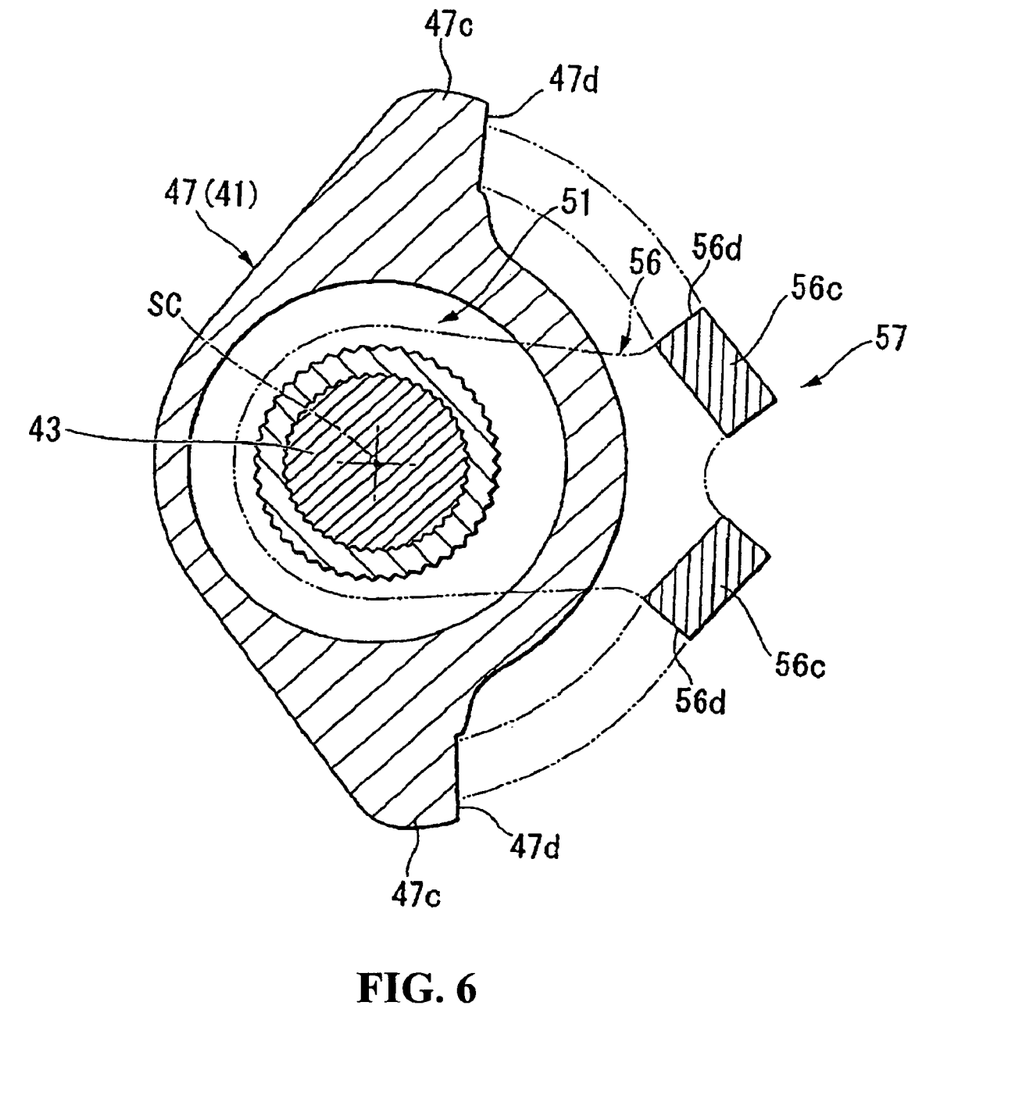
FIG. 6 is a cross-sectional view taken along the line A-A in FIG. 2.

Now, refer also to FIG. 6. A stopper portion 47c is formed in the upper portion of the upper shaft support case 47. In the stopper portion 47c, a receiving surface 47d is formed so as to face, in the shaft-rotational direction, an outer-side surface 56d of each stopper tag 56c. Each stopper tag 56c makes the outer side surface 56d be in contact with the receiving surface 47d of the stopper portion 47c at a maximum steering position of either the clockwise or the counterclockwise rotation of the steering handlebar 22. Further rotational movement of the steering shaft 21 and of the input shaft 43 is restricted in this way. In other words, the stopper tags 56c (stopper arm 56) and the stopper portions 47c form an upper handle stopper 57. The upper handle stopper 57 restricts the rotational movement of the steering shaft 21 and of the input shaft 43 and thus defines the clockwise as well as the counterclockwise maximum steering position of the steering handlebar 22.

Figure 7:
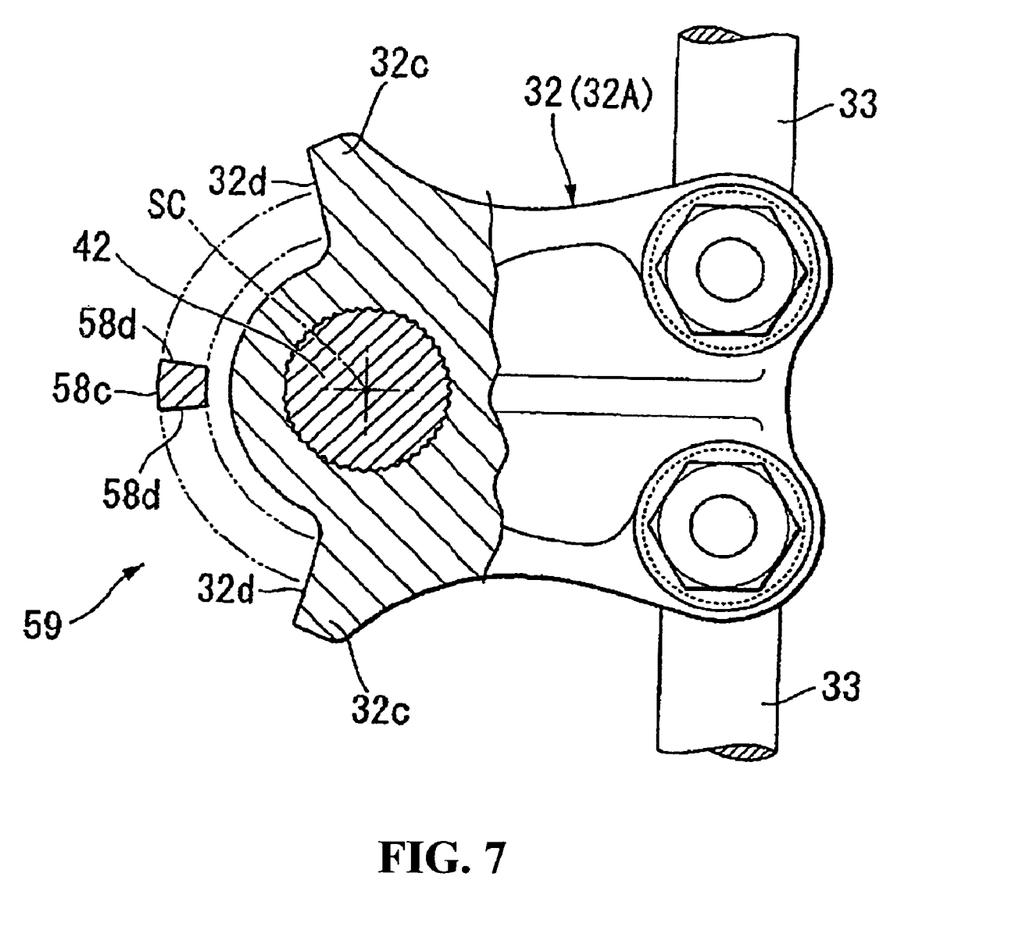
FIG. 7 is a cross-sectional view taken along the line B-B in FIG. 2.

As FIGS. 2 and 7 show, a single stopper tag 58c protrudes downwards from a front side of the lower portion of the lower shaft holder 29b. Meanwhile, a stopper portion 32c is formed on each side of the pitman arm 32. In each stopper portion 32c, a receiving surface 32d is formed so as to face, in the shaft-rotational direction, an outer side surface 58d of the stopper tag 58c.

Each stopper portion 32c has its receiving surface 32d be in contact with the outer side surface 58d of the stopper tag 58c in the maximum steering position of either clockwise or counterclockwise rotation of the steering handlebar 22. Further rotational movement of the pitman arm 32 (steering mechanism 32A) and of the output shaft 42 is restricted in this way. In other words, the stopper tag 58c and the stopper portions 32c form a lower handle stopper 59. The lower handle stopper 59 restricts further rotational movement of the pitman arm 32 and of the output shaft 42, and thus defines the clockwise as well as the counterclockwise maximum steering position of the steering handlebar 22.

Figure 5A:
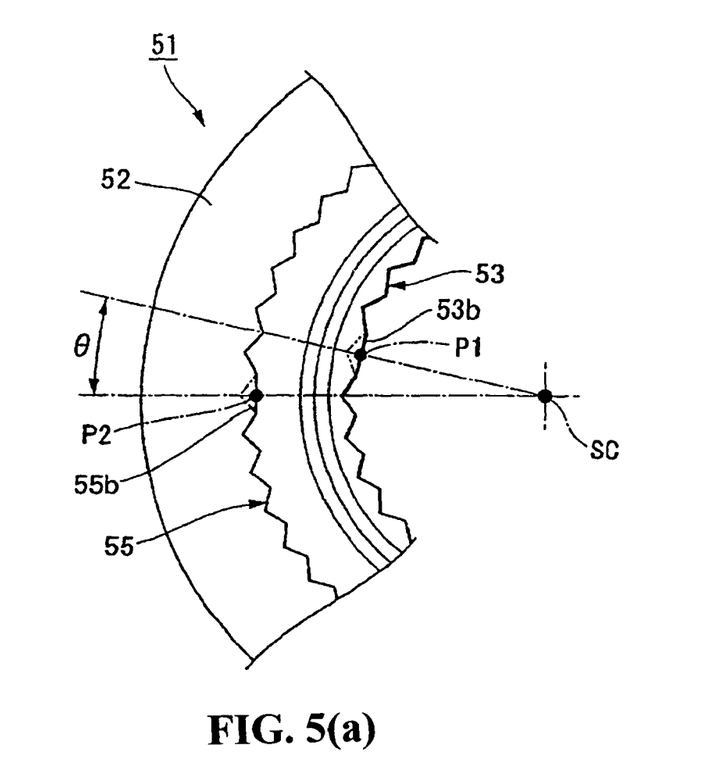
FIG. 5A is an enlarged view of the portion B in FIG. 4.

As FIG. 5A shows, in the outer splined portion 55 of the steering joint member 51 and, for example, at a position in the circumferential direction, a flat concave portion 55b is formed by cutting away a spline tooth. Meanwhile, in the steering-side splined portion 21a, a flat convex portion (not illustrated) is formed so as to correspond to the flat concave portion 55b. To form the flat convex portion, a spline valley portion is formed into a trapezoidal shape.

Likewise in the inner splined portion 53 and, for example, at a position in the circumferential direction, a flat convex portion 53b is formed by forming a spline valley portion into a trapezoidal shape. Meanwhile, in the input-side splined portion 43a, a flat concave portion (not illustrated) is formed so as to correspond to the flat convex portion 53b. To form the flat concave portion (not illustrated), a spline tooth is cut away.

Here, the center point of the flat convex portion 53b in the circumferential direction is defined as a reference position P1 for rotation of the inner splined portion 53 and of the input-side splined portion 43a (input shaft 43) about the steering shaft axis SC. In addition, the center point of the flat concave portion 55b in the circumferential direction is defined as a reference position P2 for rotation of the outer splined portion 55 and of the steering-side splined portion 21a (steering shaft 21) about the steering shaft axis SC. The reference positions P1 and P2 for rotation are arranged about the steering shaft axis SC with a predetermined relative angle difference θ. Note that the relative angle difference includes 0° by definition.

Various examples of the steering joint member 51 are provided with different relative angle differences θ from one example to another.

Figure 5B:
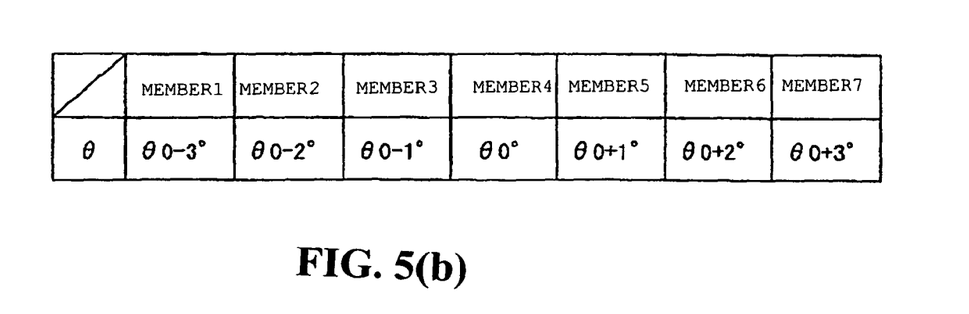
FIG. 5B is a list of the settings for the steering joint member.

FIG. 5B shows specific examples of the steering joint member 51. Seven examples in total of the steering joint member 51 are given. One example has the relative angle difference θ being the reference value (designed median value), that is, θ0. The rest of the examples have their relative angle differences θ either increased or decreased by 1° each until the value θ reaches either of 0±3°. The amount of increase or of decrease is defined as the rotational phase difference between the splined portions 53 and 55.

The reference position P1 for the rotation of the input shaft 43 is arranged with a predetermined relative angle difference (including 0°) around the steering shaft axis SC with respect to the reference position (not illustrated) for the rotation of the output shaft 42. The relative angle difference is sometimes increased or decreased within a tolerance in the rotational direction of the reference positions P1 and P2 for rotation of the shafts 42 and 43. In other words, the reference positions P1 and P2 for rotation of the respective shafts 42 and 43 are sometimes displaced from each other within the tolerance in the rotational direction. When the amount of this increase and of this decrease are the rotational phase difference between the shafts 42 and 43, input shaft 43 has a displacement of the angle equal to the rotational phase difference with respective to the output shaft 42, which is connected with the front-wheel 2 side (the side of steered road wheels).

Accordingly, assume that the steering joint member 51 is appropriately selected so as to have a rotational phase difference that can cancel the above-mentioned rotational phase difference. In this case, even when a rotational phase difference occurs between the shafts 42 and 43, this rotational phase difference can be absorbed by the steering joint member 51. As a consequence, occurrence of displacement of the rotational position of the steering-handlebar 22 with respect to the front-wheels 2 (in particular, the displacement of the rotational position of the steering handlebar 22 in a state where the front wheels 2 are in driving-straight position, that is, in the neutral position) can be eliminated. Note that when a plurality of steering joint members 51 are used, the increasing or the decreasing amount of the relative angle difference θ between the splines and the number of the patterns set may be set as appropriate in accordance with the tolerance and the like of the shafts 43 and 42 in the rotational direction of the shafts 42 and 43.

In addition, the handle stoppers 57 and 59 provided above and below the power steering unit 41 can restrict the rotational movements of the two separate shafts (input shaft 43 and the output shaft 42) respectively. Accordingly, excessive torque is prevented from acting between the input shaft 43 and the output shaft 42 (torsion bar T in particular).

As has been described thus far, in the steering shaft joint structure of the above-described embodiment, the steering shaft 21 connected to the steering-handlebar 22 is linked, via the power steering unit 41, with the steering mechanism 32A connected to the front wheels 2. In addition, the power steering unit 41 includes the input shaft 43 connected to the steering shaft 21, and the output shaft 42 connected to the steering mechanism 32A. The steering joint member 51 is connected to the input shaft 43 by spline-fitting. Meanwhile, the steering shaft 21 is connected to the steering joint member 51, likewise, by spline-fitting. The inner splined portion 53 is provided in the steering joint member 51 for connection with the input shaft 43. The outer splined portion 55 is provided for connection with the steering shaft 21. Between the inner splined portion 53 and the outer splined portion 55, a predetermined rotational phase difference can be set.

With this structure, a rotational phase difference that occurs between the input and output shafts 43 and 42 of the power steering unit 41 can be absorbed by a rotational phase difference between the splined portions 53 and 55 of the steering joint member 51. Thus prevented is a displacement between the steering-handlebar 22 and the front-wheels 2.

In addition, in the above-described steering shaft joint structure, a plurality of patterns of the rotational phase difference between the splined portions 53 and 55 of the steering joint member 51 are used. Accordingly, the rotational phase difference of the steering joint member 51 can be selected in response to, and so as to cancel, the rotational phase difference that occurs between the input shaft 43 and the output shaft 42.

Moreover, in the above-described steering shaft joint structure, the rotational phase difference between the upper and lower handle stoppers 57, 59 can be absorbed, and the rotational movements of the input shaft 43 and the output shaft 42 are simultaneously restricted. In addition, by arbitrarily setting the rotational phase difference, which one of the rotational movement of the input shaft 43 and the rotational movement of the output shaft 42 should be restricted first can be selected.

Figure 8:
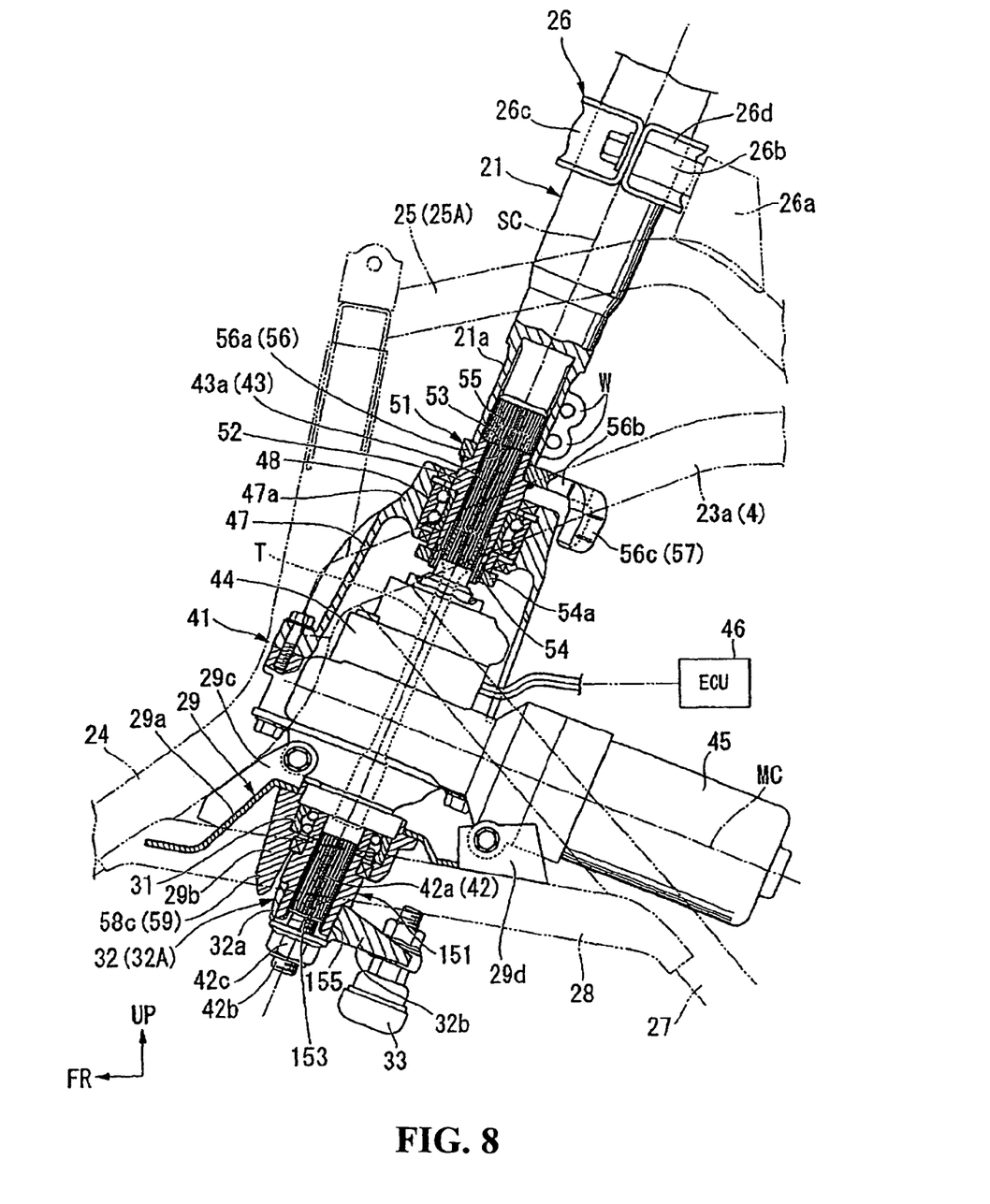
FIG. 8 is a left-side view which is an equivalent of FIG. 2 but shows a modified example of the above-mentioned embodiment.

It should be noted that the invention is not limited to the above-described embodiment. For example, as FIG. 8 shows, between an output shaft 42 and pitman arm 32 (steering mechanism 32A), a steering joint member 151 may be provided.

The cylindrical steering joint member 151 has an inner splined portion 153 which is an inner circumferential portion and which corresponds to the output-side splined portion 42a. The lower outer circumferential portion is formed into an outer splined portion 155 which corresponds to the spline formed in the inner circumferential portion of the base portion 32a of the pitman arm 32. The steering joint member 151, together with the pitman arm 32, are fixedly joined to the output shaft 42 with the nut 42c.

In addition, in the case of the steering joint member 151, a plurality of different rotational phase differences between the splined portions 153 and 155 are used as in the case of the steering joint member 51. By selecting an arbitrary one, similar effects to the above-described embodiment can be obtained.

Moreover, in still another allowable structure, a steering joint member 51 is provided between an input shaft 43 and a steering shaft, and another steering joint member 151 may be provided between an output shaft 42 and a steering mechanism. Furthermore, each of the splined portions 53 and 55 may be made split. By flange-splicing and the like on these split splined portions 53 and 55, the relative angle difference θ between the spline portions 53 and 55 can be adjusted.

It should be noted that the structure described in the embodiment are only examples of this invention. The application of the invention is not limited to a saddle-type four-wheel vehicle. Various modifications are possible without departing from the gist of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A steering shaft joint structure, comprising:
    a steering shaft joined to a steering-handlebar;
    a steering mechanism joined to a steered-road-wheel;
    a power steering unit, disposed between said steering shaft and said steering mechanism, said power steering unit including an input shaft joined to said steering shaft and an output shaft joined to said steering mechanism; and
    a steering joint member including a first joint portion joined to said input shaft and a second joint portion joined to said steering shaft,
    wherein said input shaft and said steering joint member are joined by splined-fitting or serrated-fitting, and
    wherein said steering shaft and said steering joint member are joined by splined-fitting or serrated-fitting.

2. The steering shaft joint structure according to claim 1, wherein a rotational phase difference between said first and second joint portions of said steering joint member is 0±3°.

* * * * *